(12) United States Patent
Beer et al.

(10) Patent No.: US 6,195,095 B1
(45) Date of Patent: Feb. 27, 2001

(54) METHOD AND APPARATUS FOR DISPLAYING ATTRIBUTES OF A COMPUTER WORK STATION ON A GRAPHICAL USER INTERFACE

(75) Inventors: John Carl Beer, Austin, TX (US); Mark Tweed Bowman, Boca Raton, FL (US); Georgia Ann Gibson, Georgetown; Julieta Kaoru Yamakawa, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/309,366

(22) Filed: Sep. 20, 1994

(51) Int. Cl.[7] ................................................ G06F 13/00
(52) U.S. Cl. ........................ 345/349; 345/339; 345/353
(58) Field of Search ........................... 395/155, 157, 395/159, 161, 339, 340, 343, 346, 348, 349, 352, 353, 354

(56) References Cited

U.S. PATENT DOCUMENTS

| | | | |
|---|---|---|---|
| 4,939,507 | 7/1990 | Beard et al. | 340/706 |
| 5,115,501 | 5/1992 | Kerr | 395/600 |
| 5,117,372 * | 5/1992 | Petty | 395/161 |
| 5,201,047 * | 4/1993 | Maki et al. | 395/600 |
| 5,202,828 | 4/1993 | Vertelney et al. | 364/419 |
| 5,220,675 | 6/1993 | Padawer et al. | 395/800 |
| 5,226,120 * | 7/1993 | Brown et al. | 395/200 |
| 5,226,163 | 7/1993 | Karsh et al. | 395/700 |
| 5,276,816 | 1/1994 | Cavendish et al. | 395/275 |
| 5,287,514 | 2/1994 | Gram | 395/700 |
| 5,295,244 * | 3/1994 | Dev et al. | 395/161 |
| 5,349,674 * | 9/1994 | Calvert et al. | 395/800 |
| 5,371,844 * | 12/1994 | Andrew et al. | 395/155 |
| 5,394,522 * | 2/1995 | Sanclez-Frank et al. | 395/159 |

OTHER PUBLICATIONS

Crawford et al., "Norton Desktop for Windows", 1991, pp. 102–104.*

OS/2: The Workplace Shell, Marie Tyne, 1992, Chapters 12 & 13, pp. 276–308.*

* cited by examiner

*Primary Examiner*—Ba Huynh
(74) *Attorney, Agent, or Firm*—Diane L. Roberts; Christopher L. Makay; Leslie A. Van Leeuwen

(57) ABSTRACT

A method and apparatus for displaying to a user attributes of a computer workstation includes a processor, user controls for controlling a pointer, a display device, and a database. The processor first displays a template area on the display device and then retrieves the attributes of the computer workstation from the database. After retrieving the attributes, the processor displays icons representing the attributes in the template area displayed on the display device.

21 Claims, 16 Drawing Sheets

METHOD AND APPARATUS FOR DISPLAYING ATTRIBUTES OF A COMPUTER WORK STATION ON A GRAPHICAL USER INTERFACE

BACKGROUND OF THE INVENTION

1. Field of the Invention

The present invention relates to graphical user interfaces (GUI's) of computer workstation operating systems and, more particularly, but not by way of limitation, to a method and apparatus for displaying to a user on a GUI the attributes of a computer workstation.

2. Background Information and Description of Related Art

A computer workstation requires an operating system to manage and direct workstation objects during the performance of workstation tasks such as adding/deleting users, printing, storing/retrieving data, adding/removing peripherals, etc. Examples of workstation objects include: 1) workstation devices such as I/O adaptors, memory, and peripheral devices (e.g., keyboards, mouses, or display screens), 2) workstation instructions such as user access programs, printer control programs, and memory control programs, and 3) workstation information such database files and the data contained in those files (e.g., user lists).

Before the performance of a workstation task, the user typically must access the operating system and input a command that directs the operating system to perform the desired task. Illustratively, to add a peripheral such as a disk drive or printer, the user accesses the operating system and inputs the command that begins execution of a peripheral initialization program. Such programs normally query the user in the form of sequential menus to input the type of peripheral and the particular I/O device of the workstation that must be activated to permit communication between the workstation and the new peripheral.

Similarly to permit or prevent a particular user from using the workstation, another user must access the operating system with the command that begins a user management program. The user management program then queries the user in the form of sequential menus to input either the new user data (e.g., name, title, etc.) or change the present password to stop unwanted user access.

Accordingly, manipulation of an operating system to perform workstation tasks becomes difficult because it requires the user to know and understand complicated command syntax. Inexperienced or occasional users seldom know all the complicated command syntax, resulting in their inability to properly direct the operating system to perform tasks. Furthermore, multiple sequential menus often result in the user redisplaying prior menus before inputting information because information required to make a current input resides in a prior menu. Such menu backtracking frustrates workstation users and increases the time required to perform tasks. Additionally, the user must also have advanced knowledge of the workstation and its attributes. Attributes of a workstation include the tasks the workstation is capable of performing and the types of objects the workstation will support. For example, adding a peripheral requires the user to know the attributes of which particular I/O devices are contained within the workstation and what types of peripherals those I/O's will support. Most users do not know what objects and tasks a workstation will support, resulting in their inability to properly utilize workstation attributes.

Consequently, users often operate workstations at a level below their actual computing capacity because they are unfamiliar with the both the operation and capabilities of the workstation. Thus, the display of workstation attributes to a user would significantly simplify the ability of the user to use an operating system in the direction and management of workstation tasks.

SUMMARY OF THE INVENTION

In accordance with the present invention, a method and apparatus for displaying to a user attributes of a computer workstation includes a processor, user controls for controlling a pointer, a display device, and at least one database. The processor first displays a template area on the display device and then retrieves the attributes of the computer workstation from the database. After retrieving the attributes, the processor displays icons representing the attributes in the template area displayed on the display device.

It is, therefore, an object of the present invention to provide a method and apparatus that displays to a user the attributes of a computer workstation in an easy to understand format.

It is another object of the present invention to provide a method and apparatus that allows the user to easily manipulate the display of the attributes.

Still other objects, features, and advantages of the present invention will become evident to those skilled in the art in light of the following.

DETAILED DESCRIPTION OF THE PREFERRED EMBODIMENT

The following detailed description is of the best presently contemplated mode for carrying out the invention. This detailed description is not to be viewed in a limiting sense, because it is made merely for the purpose of illustrating the general principles of the invention, the scope of which is only defined by the appended claims.

Figure 1:
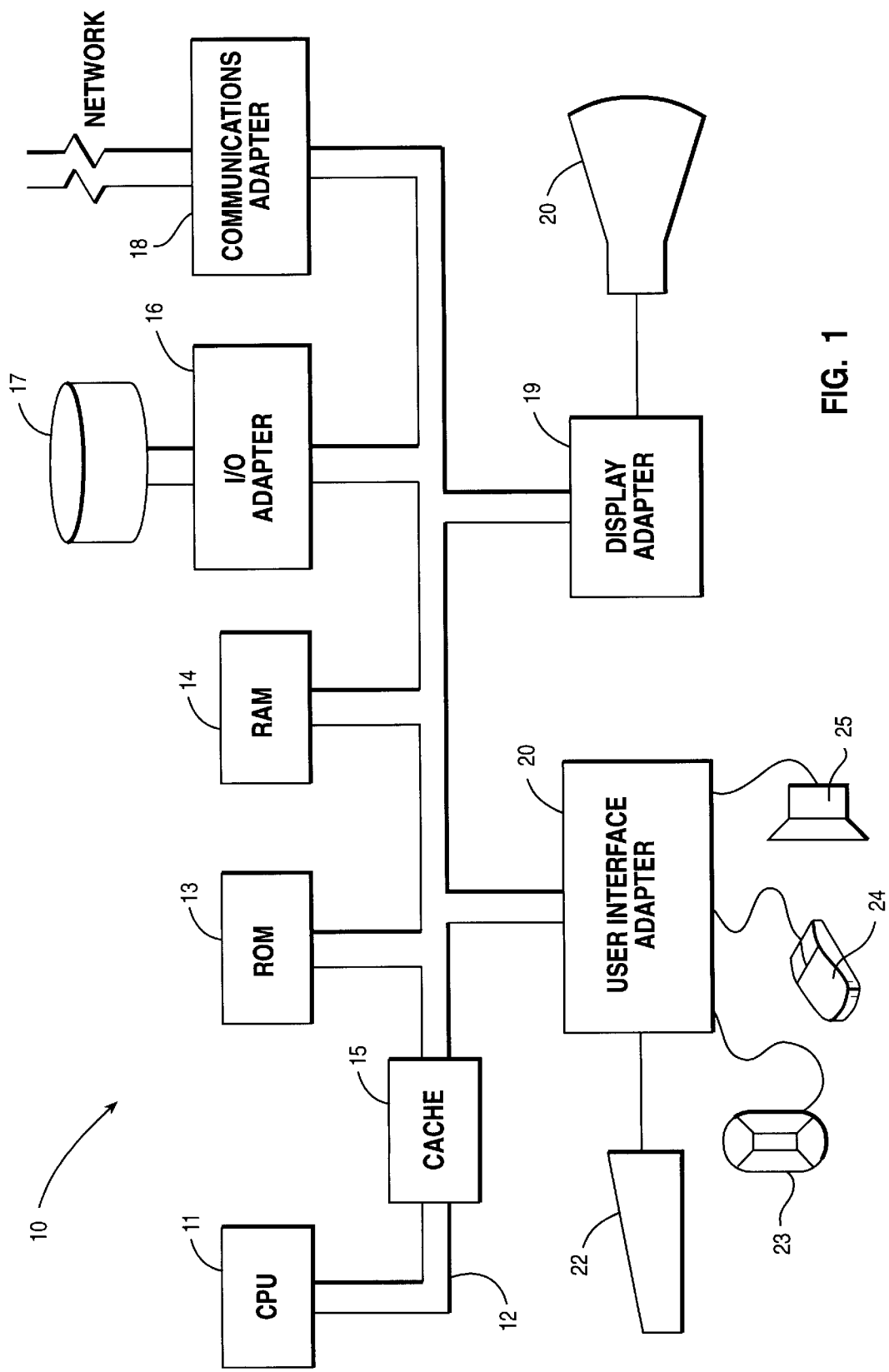
FIG. 1 is a schematic diagram illustrating an example environment that implements the present invention.

The workstation attributes display forms part of a graphical user interface (GUI) utilized by a user to access an operating system in the management and direction of workstation operations. The operating system and thus the GUI may be practiced in any suitable hardware configuration such as workstation 10 illustrated in FIG. 1 or, alternatively, a laptop computer. In this preferred embodiment, the AIX™ operating system manages the operation of workstation 10.

Workstation 10 includes any suitable central processing unit 11 such as a standard microprocessor, and any number of other objects interconnected via system bus 12. For the purpose of illustration, workstation 10 includes read only memory (ROM) 13, random access memory (RAM) 14, cache 15, I/O adapter 16 for connecting peripheral devices (e.g., disk and/or tape drives 17) to system bus 12, and communications adapter 18 for connecting workstation 10 to a data processing network. Workstation 10 further may include display adapter 19 for connecting system bus 12 to display device 20 and user interface adapter 21 for connecting system bus 12 to keyboard 22, microphone 23, mouse 24, speaker 25, or any other user input device such as a touch screen tool.

The GUI resides within a machine-readable media to interface a user to the operating system so that the user may easily manipulate the operating system to direct and manage workstation 10. Any suitable machine-readable media may retain the GUI such as ROM 13, RAM 14, or one of disk and/or tape drives 20 (e.g., a magnetic diskette, magnetic tape, CD ROM, or an optical disk). For ease of explanation, the following describes the GUI as displaying the attributes of workstation 10, however, in actuality the GUI merely controls and directs CPU 11 to display the attributes of workstation 10 on display screen 20.

Figure 2:
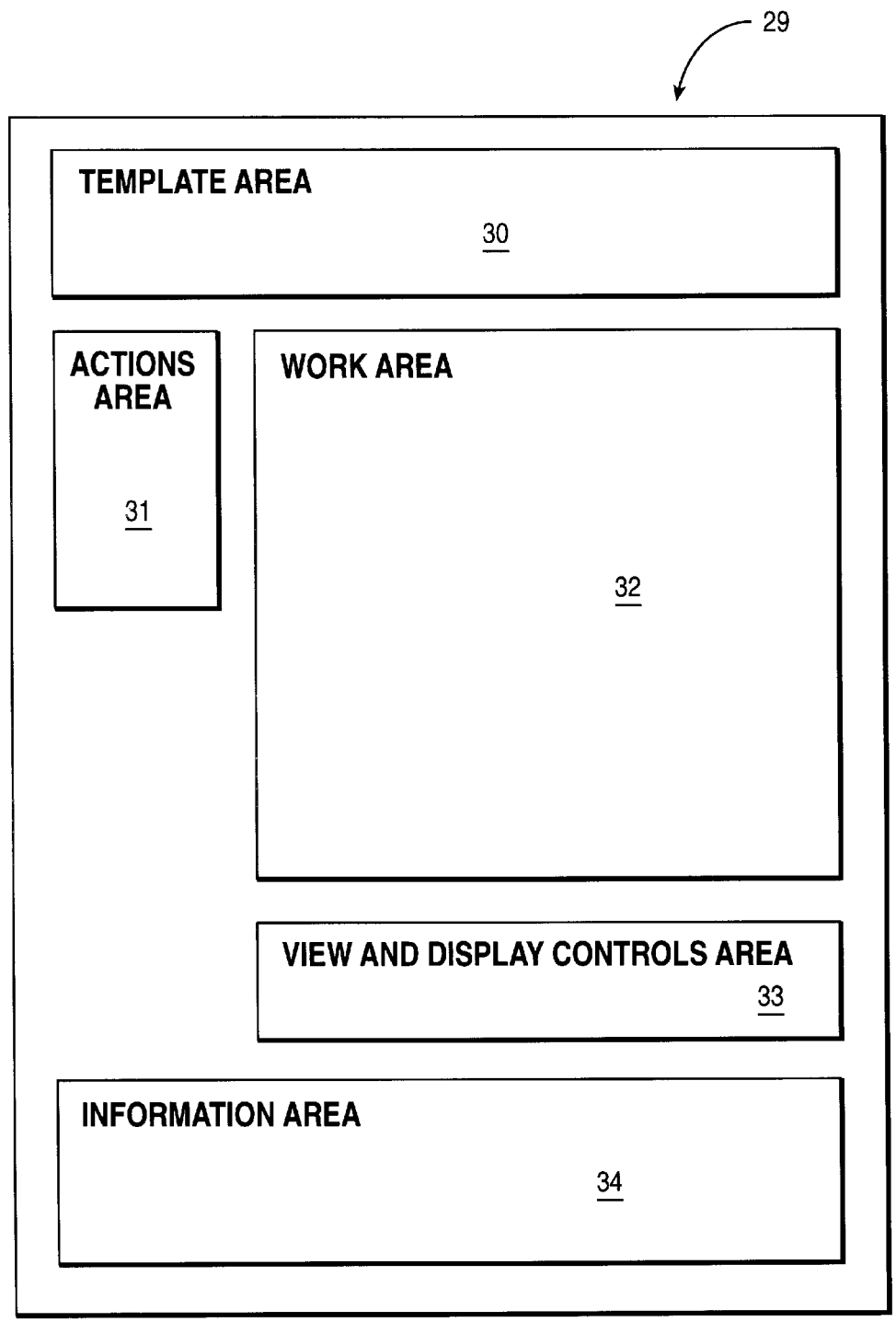
FIG. 2 is a pictorial view of a display window for a graphical user interface (GUI).

FIG. 2 illustrates the standard areas of a GUI window 29 displayed to the user which include actions area 31, work area 32, view and display controls area 33, and information area 34. FIG. 2 further illustrates template area 30 which implements the workstation attributes display. GUI window 29 includes template area 30 to display the attributes of workstation 10 to the user. Template area 30 displays the attributes of workstation 10 in the form of icons that provide the user with a visual representation of what tasks workstation 10 will support.

Template area 30 displays only one group of related attributes at a time because the large number of attributes associated with any workstation makes the display of every attribute simultaneously impractical. To further simplify the presentation of an attribute group, the related attributes of a group are divided into sets of similar attributes, and then the sets of similar attributes are displayed with an icon representing each set. Additionally, the division of attributes into groups and sets within the groups enhances display because the tasks the related attributes support are also related.

For the purposes of disclosure and to aid in the understanding of the invention, an example group of related attributes is all the devices (e.g., memory, printers, mouses, etc.) that workstation 10 will support, while an example set of the above group is all the printers that require connection to a parallel port of workstation 10. The tasks the device attributes support include allowing a user to add or remove devices from workstation 10.

Another example group of related attributes are the users that may access workstation 10, while a set of that group is the specific type of user allowed access to workstation 10. The tasks the user-access attributes support include permitting the user to add or delete users from workstation 10. Although example attributes and tasks have been described, one skilled in the art will recognize that any attribute that supports a task performable by a computer may be displayed to a user in template area 30.

GUI window 29 includes work area 32 to display to the user the objects associated with the attributes displayed in template area 30. Illustratively, if the attributes are the devices workstation 10 is capable of supporting, then work area 32 displays in the form of icons the devices that workstation 10 actually supports. That is, template area 30 displays all the possible devices that workstation 10 can support, while work area 32 displays the devices actually interfaced to workstation 10. Alternatively, if the attributes are the types of users allowed access to workstation 10, then work area 32 displays in the form of icons the users that actually are allowed access to workstation 10.

GUI window 29 includes actions area 31 to furnish the user with a list of icons that represent the commands available to the user to complete a workstation task. Similar to work area 32, the command icons listed in actions area 31 depend upon which attributes of workstation 10 are displayed in template area 30. Illustratively, if the displayed attributes are the devices workstation 10 is capable of supporting, actions area 31 includes command icons that permit the user to activate and deactivate workstation devices such as I/O ports, printers, etc.

GUI window 29 includes view and display controls area 33 to furnish the user with a list of icons representing the view and display options for template area 30 and work area 32. The view and display options permit the user to alter how the attributes and objects are presented within template area 30 and work area 32, respectively. Again, the icons listed in view and display controls area 33 depend upon which attributes of workstation 10 are displayed in template area 30. Illustratively, if the displayed attributes are the devices workstation 10 is capable of supporting, view and display controls area 33 includes command icons that permit the user to vary the size of the attribute icons displayed in template area 30. Additionally, GUI window 29 includes information area 34 to display textual information describing the other areas within the window and their functions.

Figure 3:
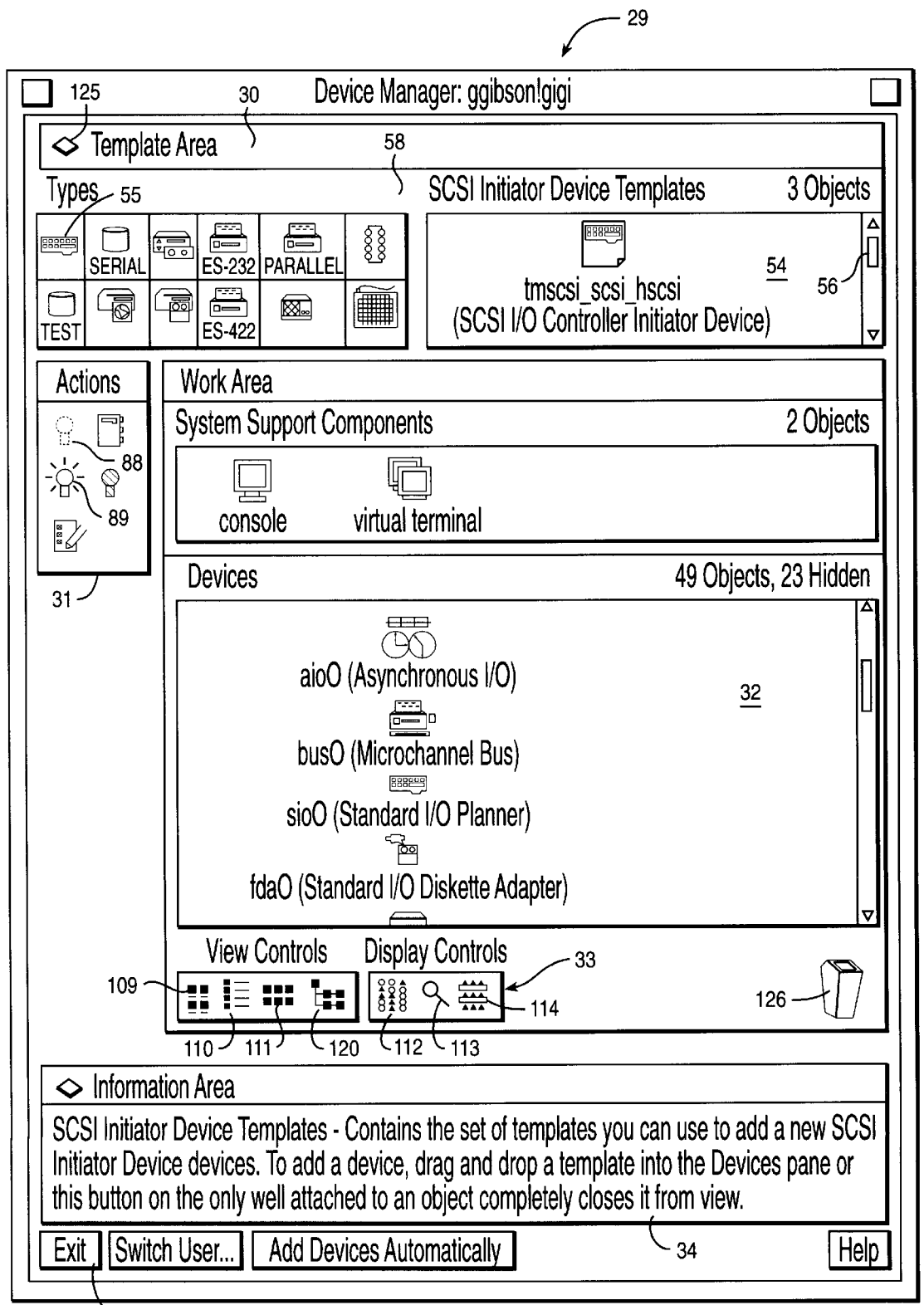
FIG. 3 is pictorial view of a GUI display window that implements the present invention.

As illustrated in FIG. 3, template area 30 displays only one group of related attributes of workstation 10 at a time to simplify user viewing. The specific attributes displayed in template area 30 are the device attributes previously described. In this preferred embodiment, template area 30 includes template type pane 57, template pane 54, template title pane 58, scroll bar 56, and template area control button 125. Template area 30 includes template type pane 57 to display template types (i.e., icons representing the sets of similar attributes) so that the user will have an index of attributes in the attribute group. Template area 30 includes template pane 54 to display templates in the form of icons that represent the individual attributes in an attribute set the user is presently viewing. Template title pane 58 displays the name of the individual attributes displayed, while the scroll bar allows the user to view each individual attribute because template pane 54 is not large enough to display all the individual attributes simultaneously.

Figure 4:
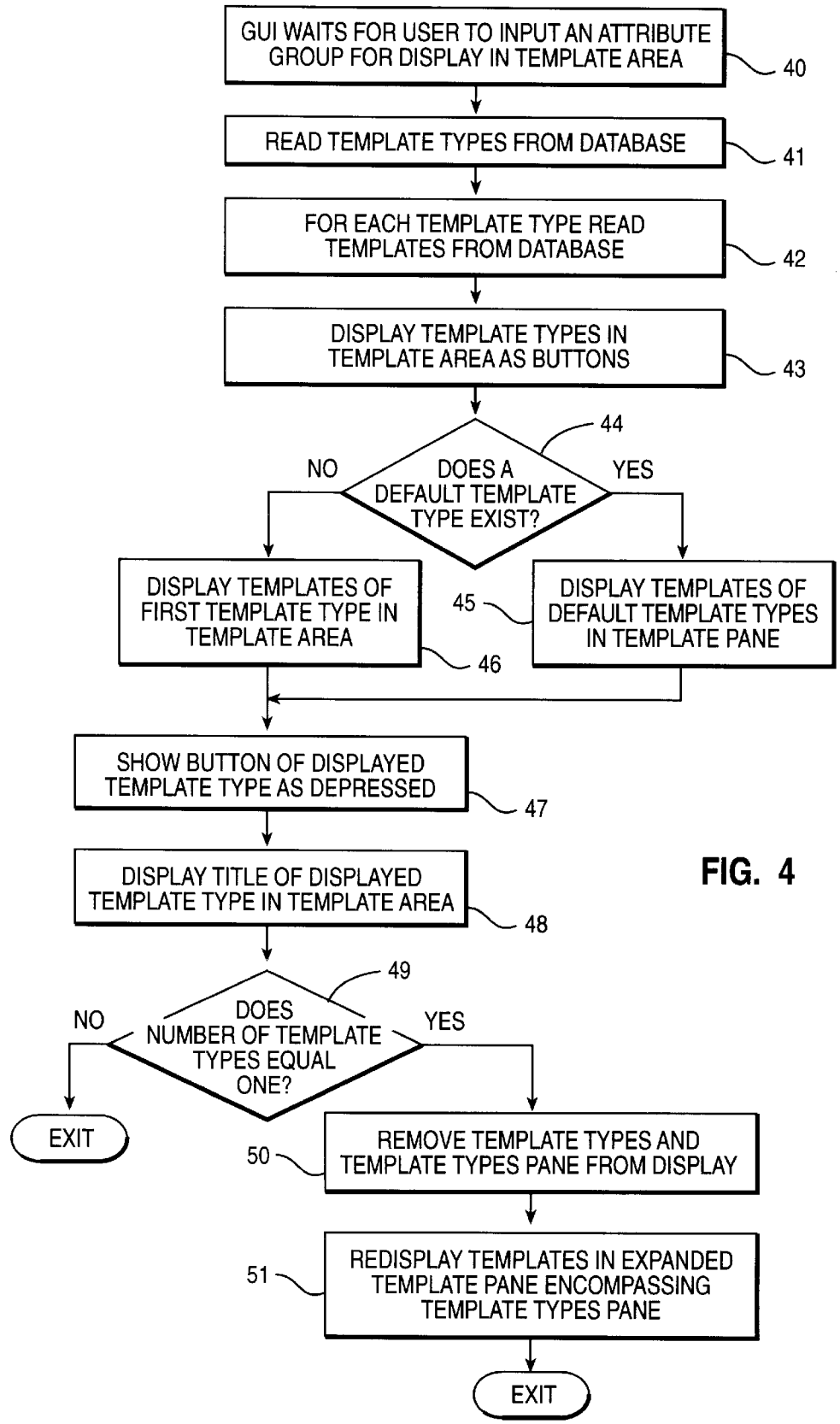
FIG. 4 is a flowchart illustrating a routine for displaying the attributes of a computer workstation.

FIG. 4 illustrates the routine that displays the attributes of workstation 10 within template area 30. At step 40, the GUI waits for the user to input an attribute group for display in template area 30. Although various devices may be utilized by the user to input to the GUI, for ease of disclosure, the input device is a mouse having a selection button that is pressed and released after the mouse has been utilized by the user to move the cursor to the desired selection presented to the user by the GUI. Thus, the GUI presents the user with a list of attribute groups from which the user may select one for display.

In response to the selection of an attribute group, step 41 reads the template types (i.e., the sets of similar attributes within the attribute group) from a database that may reside in RAM 14, disk and/or tape drive 17, or the database network connected to work station 10 via communications adaptor 18. After the template types are read from the database, step 42 reads all the templates (i.e., individual attributes) for each template type from the database. Step 43 then displays the template types in template type pane 57 as icons in the form of buttons (see FIG. 3).

After the display of the template types, it is necessary to select a template type so that the templates (i.e., the individual attributes in an attribute set) may be displayed in template pane 54. Decision step 44 determines if a default template type exists for the display of its templates in template pane 54. If a default template type exists, the templates in the default template type are displayed in template pane 54.

However, if no default template type exists, the templates in the first template type in the set of template types are displayed. The first template type in the set of template types is represented in FIG. 3 by numeral 55. After the templates of either the default template type or the first template type have been displayed, step 47 displays the button icon representing the displayed template type as depressed (see numeral 55 in FIG. 3). Step 48 then displays in template title pane 58 over template pane 54 (see FIG. 3) the title of the displayed templates.

If the number of templates in the displayed template type is larger than the number of templates that template pane 54 can display at one time, only the number of templates that fit within template pane 54 are displayed. However, template area 30 includes scroll bar 56 that permits the user to scroll template pane 54 to sequentially display each template in the displayed template type.

Figure 16:
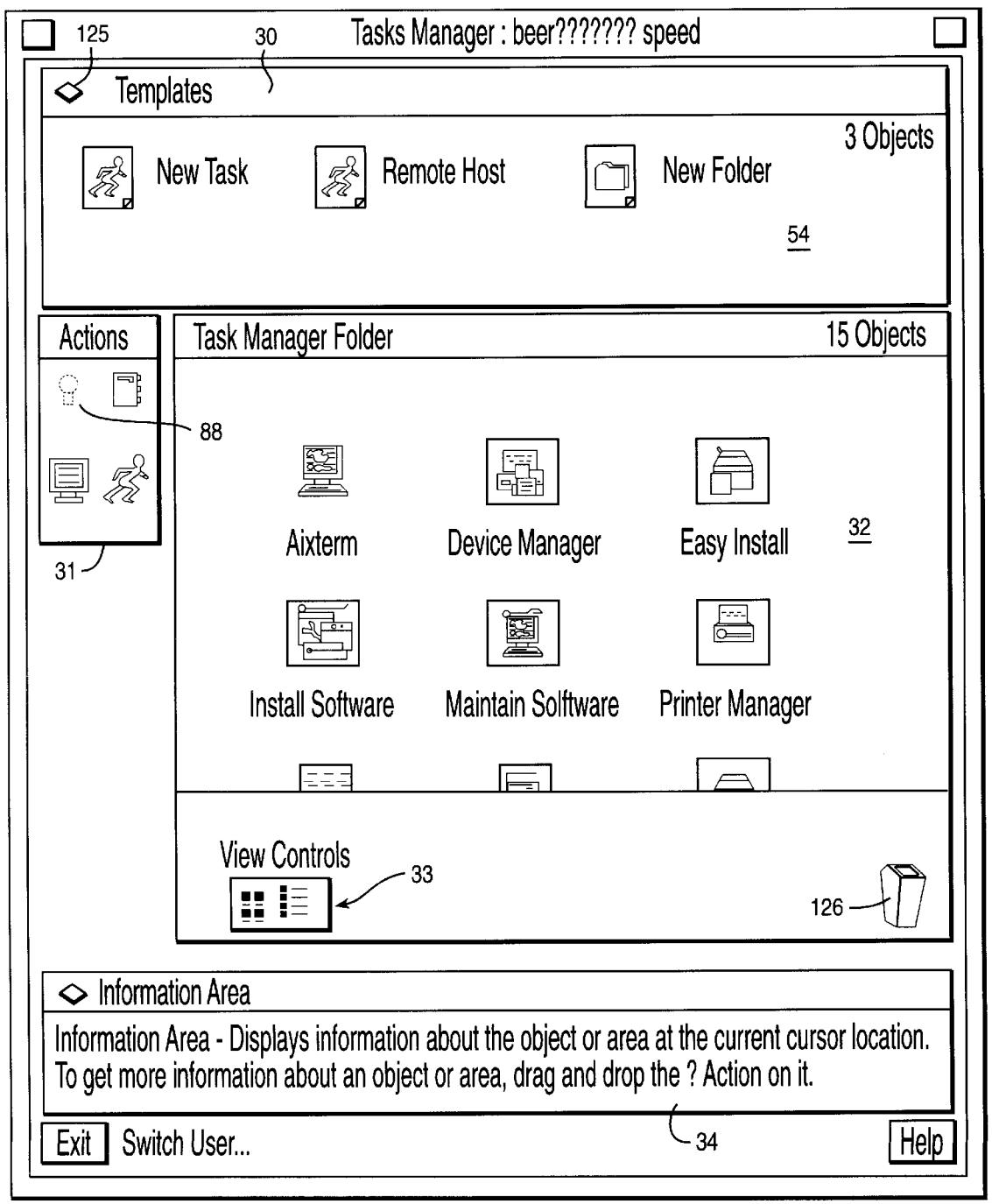
FIG. 16 is pictorial view of a GUI display window that implements the present invention.

After displaying the templates of either the default or first template type, decision steps 49 determines if template type pane 57 of template area 30 needs to be displayed to the user. Decision step 49 determines if the number of template types in template type pane 54 equals one. If there is more than one template type within template types pane 57, step 49 exits the routine so that other routines may be executed. However, if the number of template types within template types pane 57 equals one, step 50 removes the displayed template type and template types pane 57 from user view. Next, step 51 redisplays the templates in an expanded template pane 54 that encompasses the section of template area 30 initially displaying template types pane 54 as illustrated in FIG. 16. Step 51 then exits the routine so that other routines may be executed.

Figure 6:
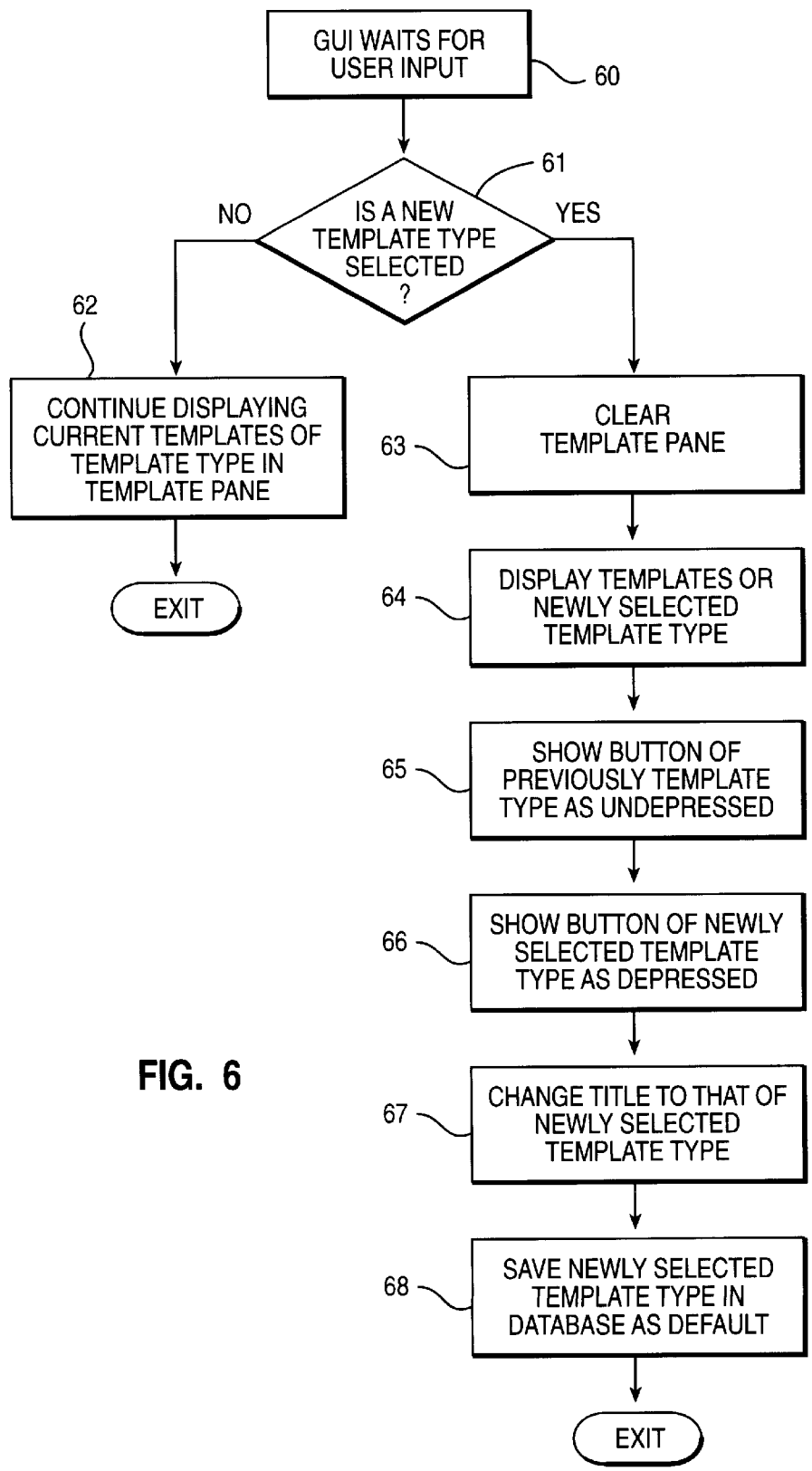
FIG. 6 is a flowchart illustrating a routine for selecting template type to be displayed.

FIG. 6 illustrates the routine that allows the user to change the template type that displays templates in template pane 54. At step 60, the GUI waits for the user to input which template type should display templates in template pane 61. User input to select a template type consists of manipulating a mouse to move a cursor over a template type and then pressing and releasing a selection button on the mouse. After the GUI receives the user selection, decision step 61 determines if a new template type has been selected. If no new template type has been selected, step 62 continues the display of the templates in the current template type and exits the routine so that another routine may be executed.

Alternatively, if decision step 61 determines that a new template type was selected, step 63 clears the currently displayed templates from template pane 54. Step 64 then displays the templates of the newly selected template type in template pane 54 to replace the erased templates. Next, step 65 changes the button icon of the previously displayed template type so that it appears undepressed. Conversely, step 66 changes the button icon of the newly selected template type so that it appears depressed (see numeral 59 in FIG. 11). After the depression of the newly selected template type button icon, step 67 changes the title in template title pane 58 to reflect the title of the templates in newly displayed template type. Finally, step 68 saves the newly selected template type in the database as the default template type for display as described with reference to FIG. 4 and exits the routine so that other routines may be executed.

Figure 7:
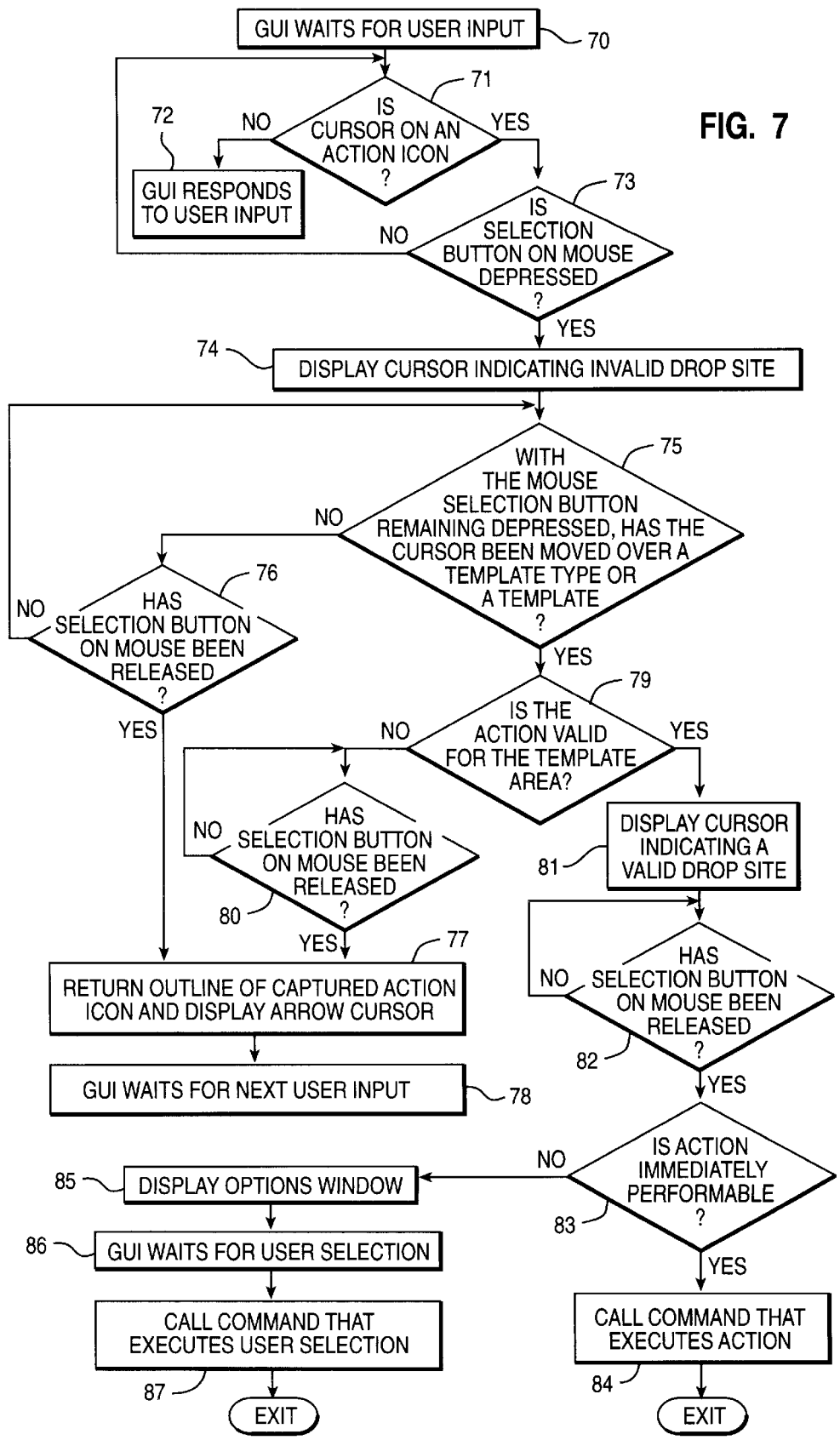
FIG. 7 is a flowchart illustrating a routine for manipulating a template area with action commands.

FIG. 7 illustrates the routine that allows the user to manipulate template area 30 using commands from actions area 31. In step 70, the GUI waits for user input which again is the manipulation of the mouse to move the cursor followed by a selection made utilizing the selection button of the mouse. Decision step 71 determines if the cursor resides over an icon in action area 31. If the cursor is not on an action icon, the GUI responds based upon the user input which, illustratively, could be the changing of the displayed template types as previously described with reference to FIG. 6.

However, if the cursor resides on an action icon, then decision step 73 determines whether the selection button on the mouse is depressed. If the mouse selection button is not depressed, decision step 71 repeats to determine if the cursor remains on the action icon. If decision step 73 determines the mouse selection button has been depressed, then the GUI recognizes the action icon as captured, and step 74 displays a cursor indicating an invalid drop site. That is, the cursor changes from an arrow into a circle with a line through it residing over an outline of the captured action icon to indicate to the user that the selected command cannot be performed at its present location.

Decision step 75 determines if the action icon has been relocated over a template type or a template by moving the cursor with the mouse while maintaining the mouse selection button depressed. If the cursor does not reside over a template type or a template, decision step 76 determines if the mouse selection button has been released. If the mouse selection button has not been released, decision step 75 is repeated, otherwise, step 77 returns the outline of the captured action icon to its position within actions area 31 and displays the arrow cursor to signify the release of the action icon. After releasing the captured action icon, the GUI waits for another user input in step 78.

If decision step 75 determines the cursor resides over a template type or a template, decision step 79 determines if the action represented by the action icon is valid for template area 30. If the action is not valid for template area 30, decision step 80 waits for the release of the mouse selection button. When the mouse selection button is released, step 77 returns the outline of captured action icon to its position within actions area 31 and displays the arrow cursor to signify the captured action is released. After step 77, the GUI waits for the next user input at step 78.

If the action is valid for template area 30, step 81 displays a cursor indicating a valid drop site which is the outline of the captured action icon without the circle with a line through it residing on top. Decision step 82 determines when the mouse selection button has been released. After release of the mouse selection button, decision step 83 determines if the action is immediately performable. If the action is immediately performable, step 84 calls the command that executes the desired action within template area 30 and exits the routine, otherwise, step 85 displays an options window to the user. In step 86, the GUI waits for the user to make a selection from the options window created in step 85. After the GUI receives a user selection in step 86, step 87 calls the command that executes the action represented by the user selection and exits the routine.

FIG. 3 illustrates example actions in action area 31 that appear when the attributes displayed are the devices that workstation 10 will support. Question mark icon 88 allows the user to access a help window displaying textual information about templates or template types. After selection and placement over a template type or template as described above with reference to FIG. 7, when the mouse selection button is released, the GUI displays a window holding textual information describing the template type or template. Alternatively, "on" icon 89 will not function in template area 30 so that, if "on" icon 89 is selected and the cursor moved into template area 30, the cursor will remain in the shape signifying an invalid drop site. Furthermore, if the mouse selection button is released in template area 30, the outline of "on" icon 89 returns to its position within actions area 31, the cursor changes back into an arrow, and no other action is performed.

Figure 8:
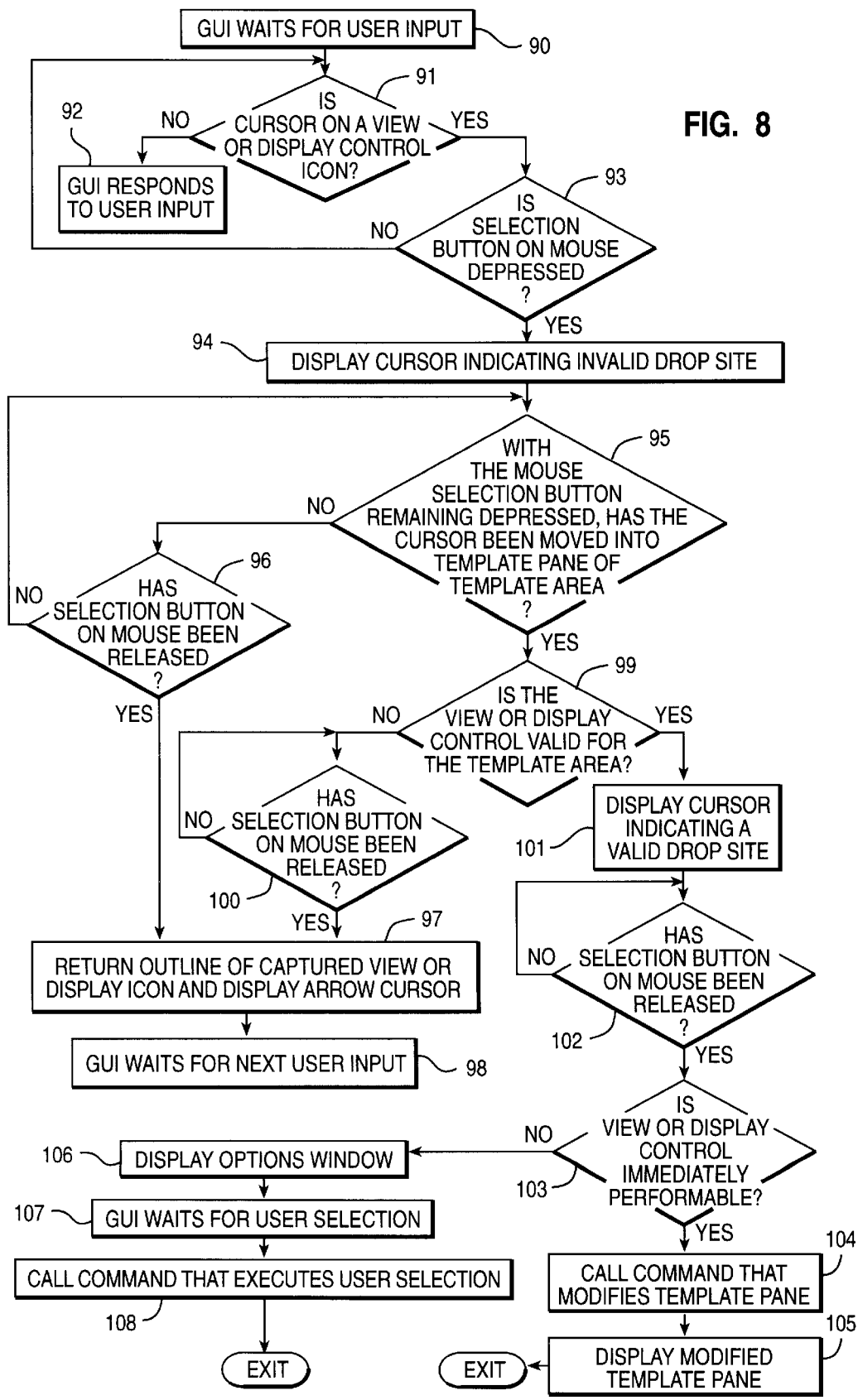
FIG. 8 is a flow chart illustrating a routine for manipulating view and display of attributes in a template area.

FIG. 8 illustrates the routine that allows the user to manipulate template pane 54 using commands within view and display controls area 33. In step 90, the GUI waits for user input which again is the manipulation of the mouse to move the cursor followed by a selection made utilizing the selection button of the mouse. Decision step 91 determines if the cursor resides over an icon in view and or display controls area 33. If the cursor is not on an action icon, the GUI responds based upon the user input which, illustratively, could be the changing of the displayed template types as previously described with reference to FIG. 6, or the execution of an action as previously described with reference to FIG. 7.

However, if the cursor resides on a view or display icon, then decision step 93 determines whether the selection button on the mouse is depressed. If the mouse selection button is not depressed, decision step 91 repeats to determine if the cursor remains on the view or display icon. If decision step 93 determines the mouse selection button has been depressed, then the GUI recognizes the view or display icon as captured, and step 94 displays a cursor indicating an invalid drop site. That is, the cursor changes from an arrow into a circle with a line through it residing over an outline of the captured view or display icon to indicate to the user that the selected command cannot be performed at its present location.

Decision step 95 determines if the view or display icon has been relocated into template pane! 54 by moving the cursor with the mouse while maintaining the mouse selection button depressed. If the cursor does not reside within template pane 54, decision step 96 determines if the mouse selection button has been released. If the mouse selection button has not been released, decision step 95 is repeated, otherwise, step 97 returns the outline of the captured view or display icon to its position within view and display controls area 33 and displays the arrow cursor to signify the captured icon has been released. After releasing the captured icon, the GUI waits for another user input in step 98.

If decision step 95 determines the cursor resides within template pane 54, decision step 99 determines if the view or display control represented by the icon is valid for template pane 54. If the control is not valid for template pane 54, decision step 100 waits for the release of the mouse selection button. When the mouse selection button is released, step 97 returns the outline of the captured view or display icon to its position within view and display controls area 33 and displays the arrow cursor to signify the captured icon is released. After step 97, the GUI waits for the next user input at step 98.

If the view or display control is valid for template pane 54, step 101 displays a cursor indicating a valid drop site which is an outline of the captured view or display control icon. Decision step 102 determines when the mouse selection button has been released. After release of the mouse selection button, decision step 103 determines if the view or display control is immediately performable. If the view or display control is immediately performable, step 104 calls the command that modifies template pane 54 followed by step 105 which displays the modified template pane and then exits the routine.

Otherwise step 106 displays an options window to the user. In step 107, the GUI waits for the user to make a selection from the options window created in step 106. After the GUI receives a user selection in step 107, step 108 calls the command that executes the action represented by the user selection and exits the routine.

FIGS. 3 and 9–11 illustrate example view and display controls within view and display controls area 33. Large icon control 109 manipulates the display of templates within template pane 54. When large icon control 109 is selected and utilized to manipulate the templates in template pane 54 as described above with reference to FIG. 8, the templates in template pane 54 are displayed as illustrated in FIG. 4. That is, the templates are large and have their descriptive textual information placed underneath.

Figure 9:
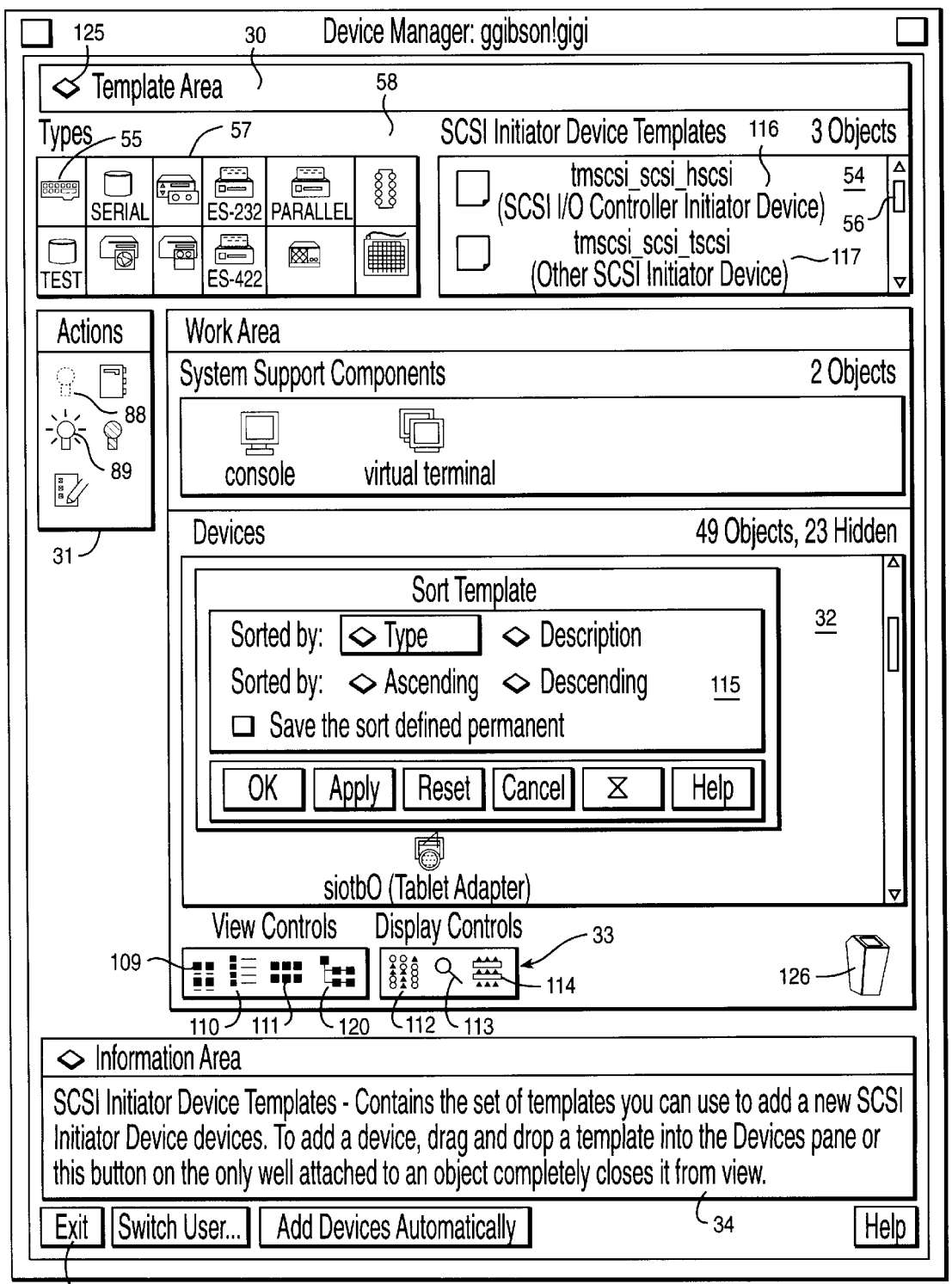
FIGS. 9–11 are pictorial views of a GUI display window that implements the present invention.

Conversely, when small icon control 110 is selected and utilized to manipulate the templates in template pane 54 as described above with reference to FIG. 8, the templates in template pane 54 are displayed as illustrated in FIG. 9. That is, the templates are small in size and include their textual descriptions displayed to the right. Alternatively, free form view icon 111 and tree form view icon 120 will not function in template pane 54 so that, if either is selected and the cursor moved into template pane 54, the cursor will remain in the shape signifying an invalid drop site. Furthermore, if the mouse selection button is released in template pane 54, the outline of either free form view icon 111 or tree form view icon 120 returns to its position within view and display control area 33, the cursor changes back into an arrow, and no other action is performed.

As illustrated in FIG. 9, sort display control 112 permits the user to sort the templates displayed in template pane 54. The cursor is placed over sort display control 112 so that the steps 91–95, 99, and 101–103 as previously described with reference to FIG. 8 may be performed. Upon completion of decision step 103, step 106 executes to display to the user sort templates window 115. Sort templates window 115 permits the user to sort the templates by type (i.e., the type of device as represented in template pane line 116) or by description (i.e., the device description as illustrated template pane line 117). After performing the sort in step 108, the sorted templates are displayed in template pane 54.

Figure 10:
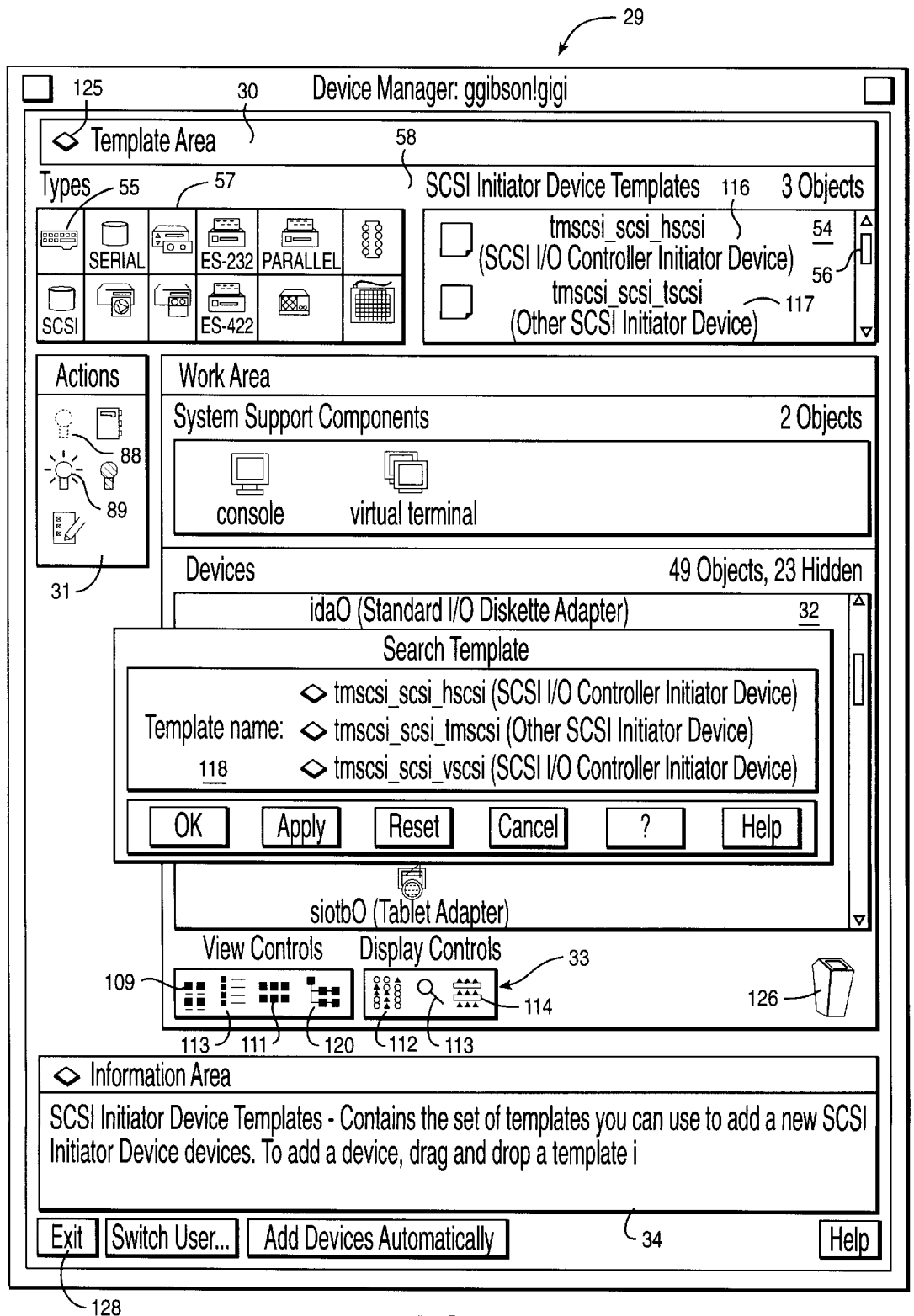

As illustrated in FIG. 10, find display control 113 permits the user to find a specific templates displayed in template pane 54. The cursor is placed over find display control 112 so that the steps 91–95, 99, and 101–103 as previously described with reference to FIG. 8 may be performed. Upon completion of decision step 103, step 106 executes to display to the user search templates window 118. Search templates window 118 permits the user to enter the name of a desired template so that the template may be located within template pane 54. After performing the search in step 108, the template located during the search is displayed in template pane 54.

Figure 11:
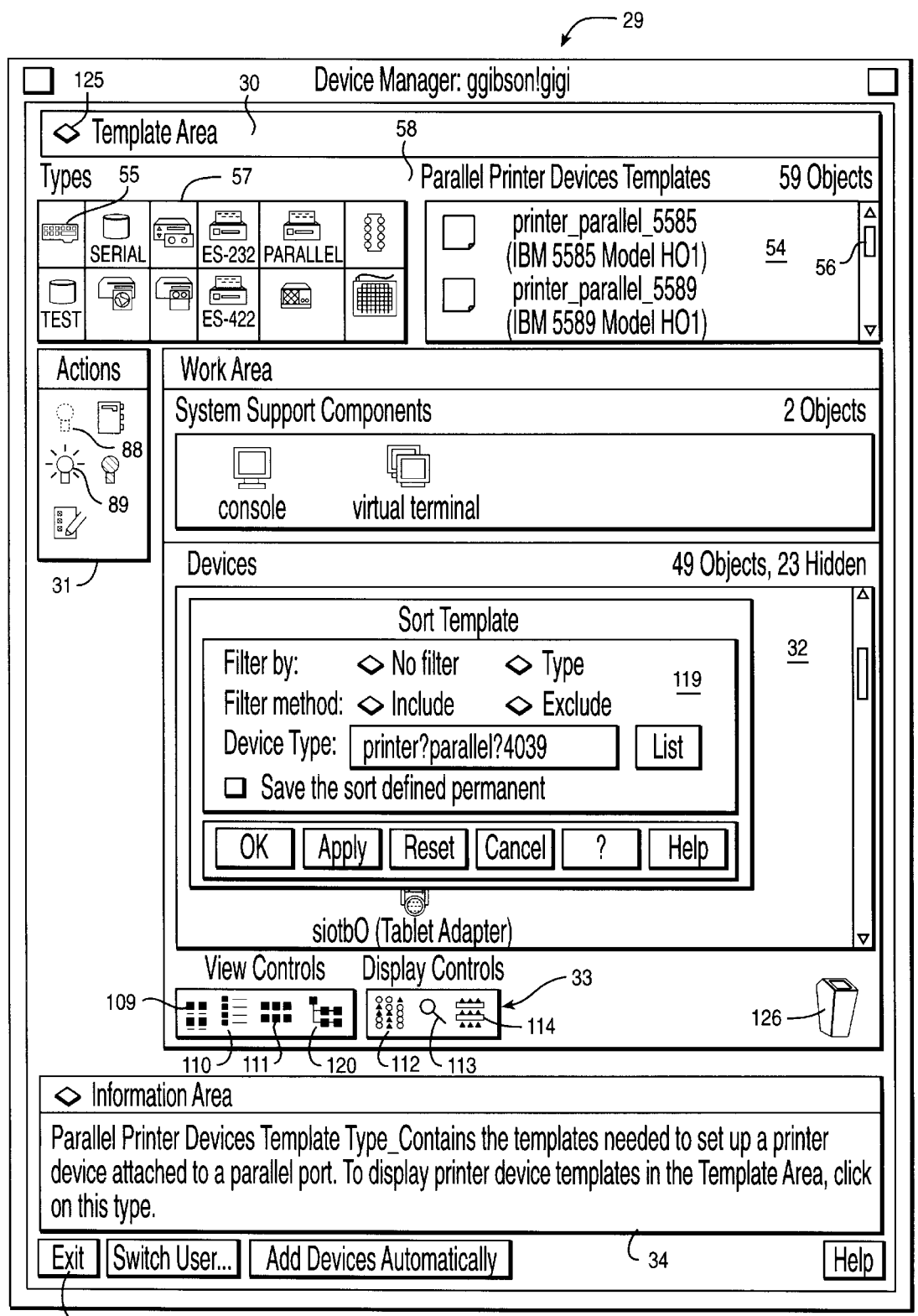

As illustrated in FIG. 11, filter display control 114 permits the user to find a subset of similar templates displayed in template pane 54. The cursor is placed over filter display control 114 so that the steps 91–95, 99, and 101–103 as previously described with reference to FIG. 8 may be performed. Upon completion of decision step 103, step 106 executes to display to the user filter templates window 119. Filter templates window 119 permits the user to enter the description of the desired subset of similar templates so that the templates may be located within template pane 54. After performing the filter in step 108, the templates located during the filtering are displayed in template pane 54.

Figure 12:
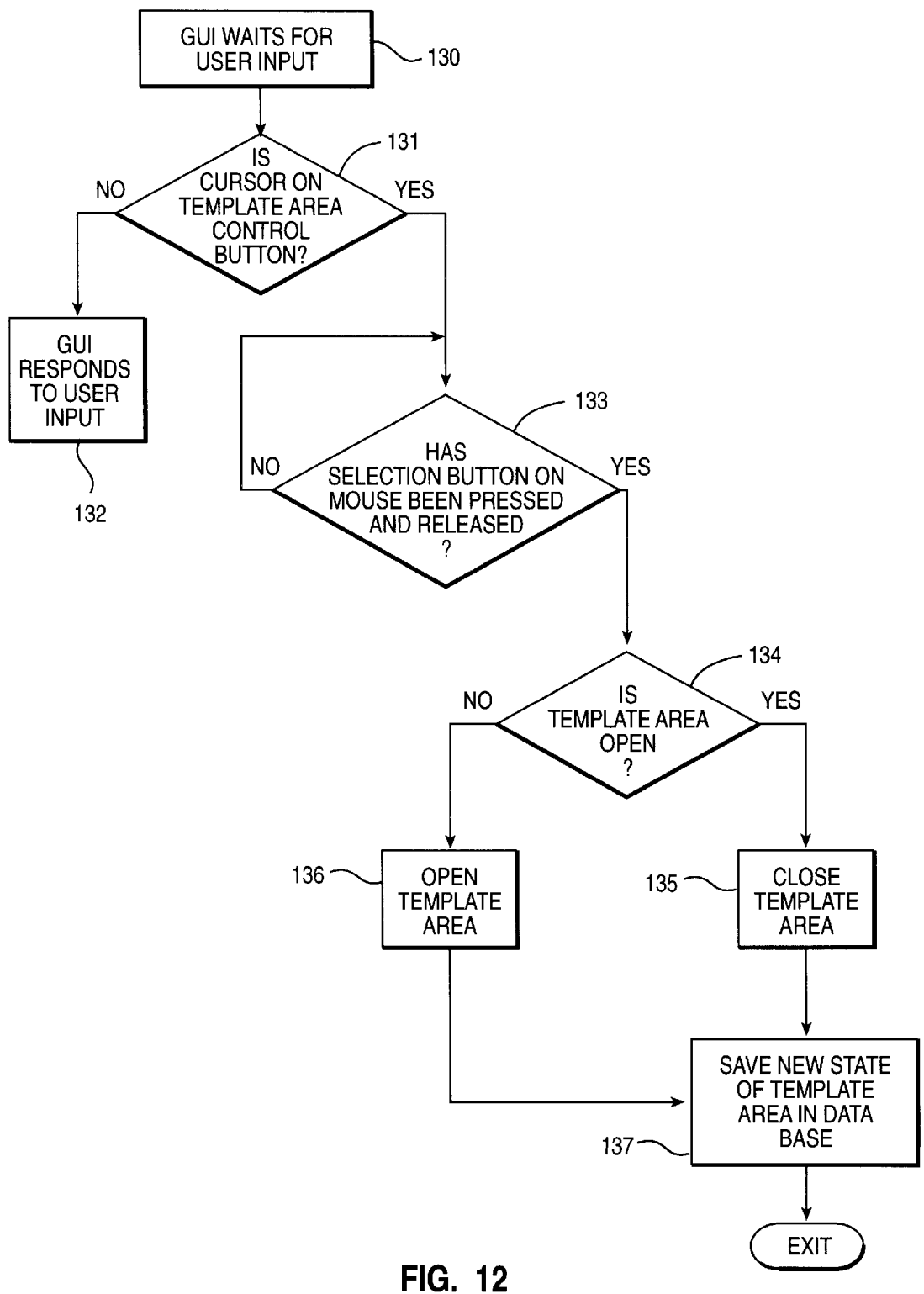
FIG. 12 is a flow chart illustrating a routine for opening and closing a template area.

FIG. 12 illustrates the routine that permits the user to pen and close template area 30. At step 130, the GUI waits for user input which is typically received through the manipulation of a cursor using a mouse as previously described. When the GUI receives a user input, decision step 131 determines if the cursor resides over the icon representing template area control button 125. If the cursor is not, the (GUI responds to the user input accordingly, which may be the execution of any of the routines previously described.

Figure 5:
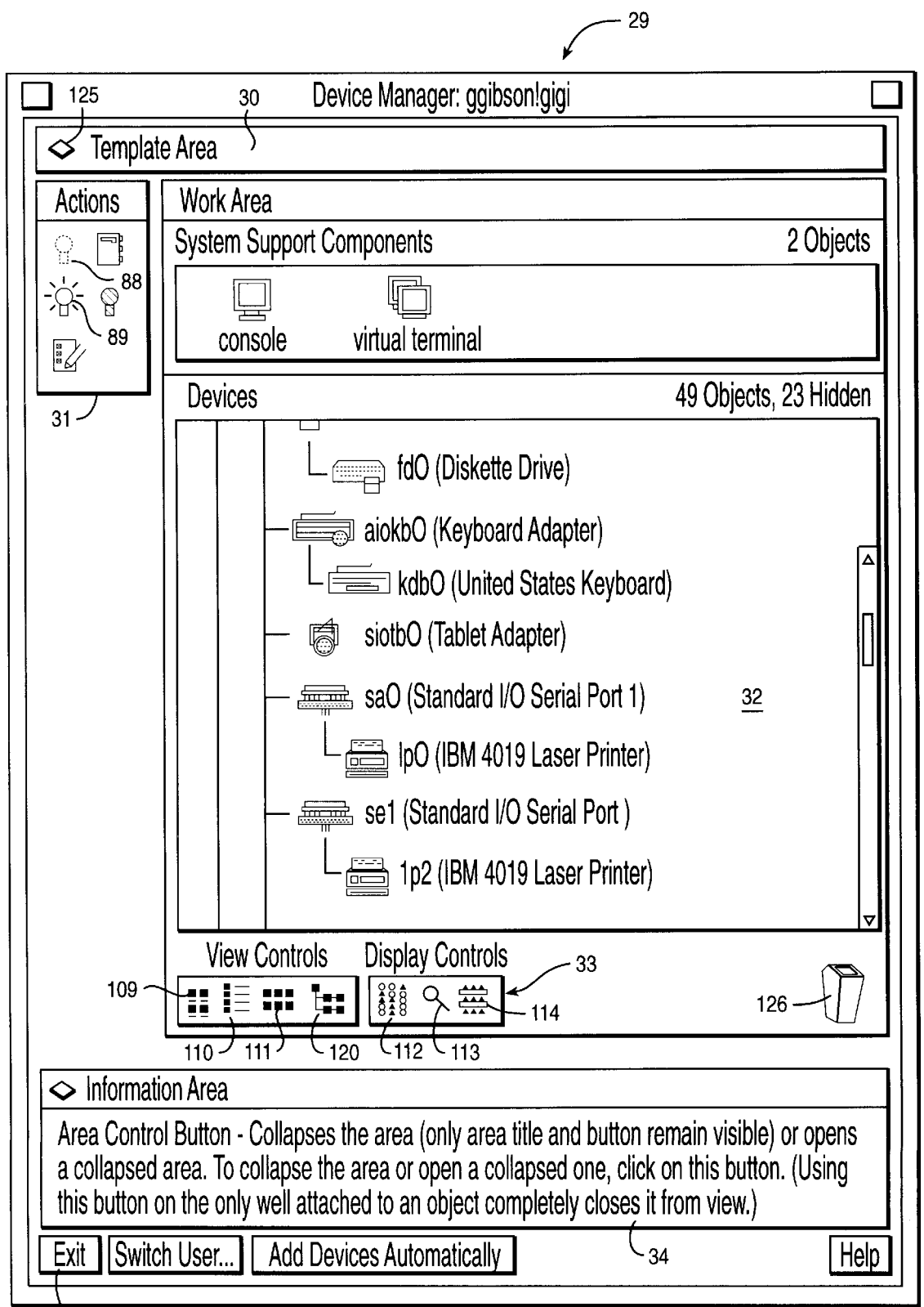
FIG. 5 is pictorial view of a GUI display window that implements the present invention.

If the cursor resides over template area control button 125, decision step 133 determines when the mouse selection button has been pressed and released. After "clicking" the mouse selection button, decision step 134 determines if the template area is open. If the template area is open, step 135 closes template area 30 as illustrated in FIG. 5. Conversely, if template area 30 is closed, step 136 opens template area 30 as illustrated in FIG. 4 so that the template types and templates of the selected template type are displayed. Finally, step 137 saves the new state of template area 30 (i.e., either opened or closed) in the database to provide a default value for step 51 as previously described with reference to FIG. 3 and exits the routine.

Figure 13:
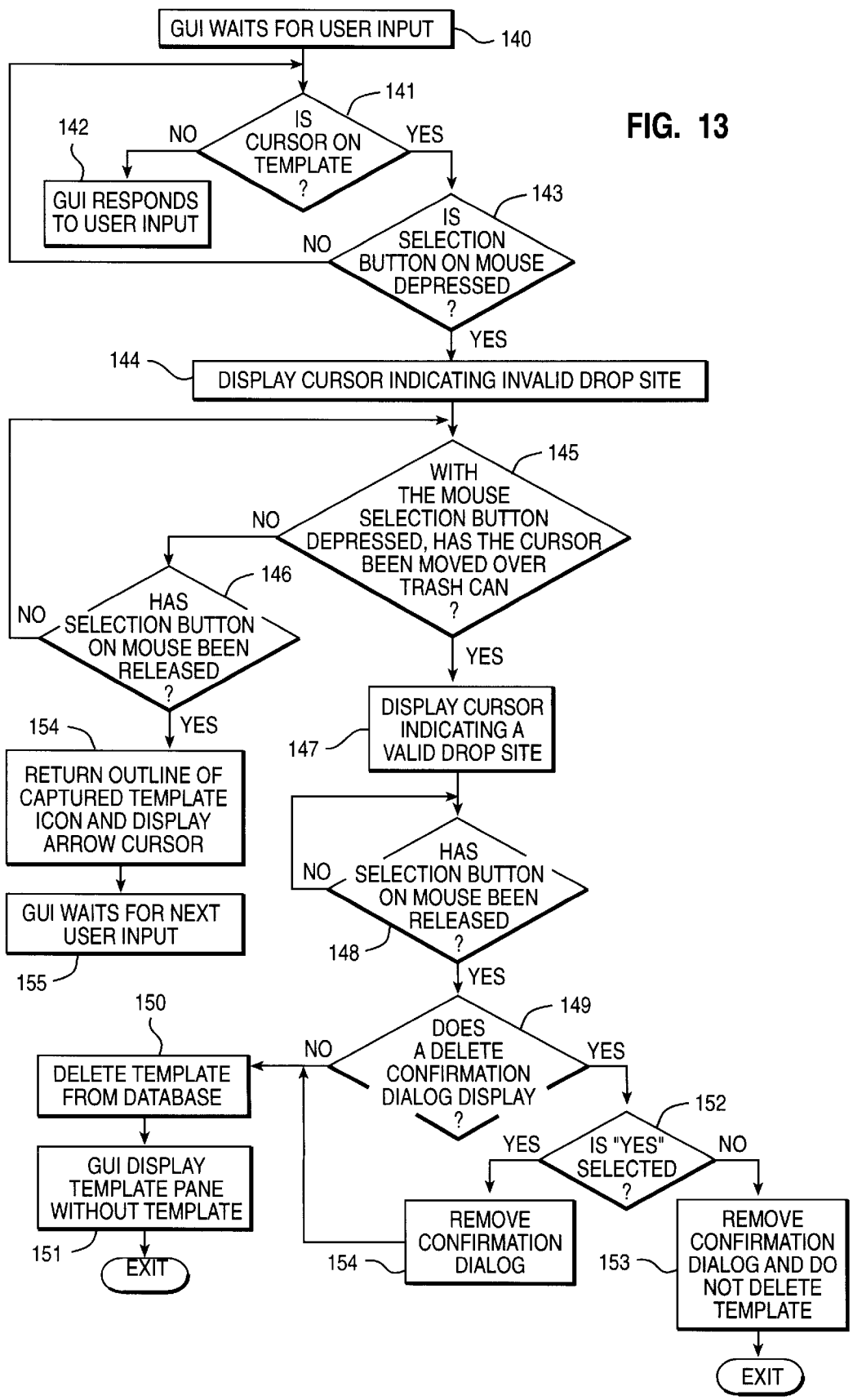
FIG. 13 is a flow chart illustrating a routine for deleting templates from a template pane of a template area.
Figure 14:
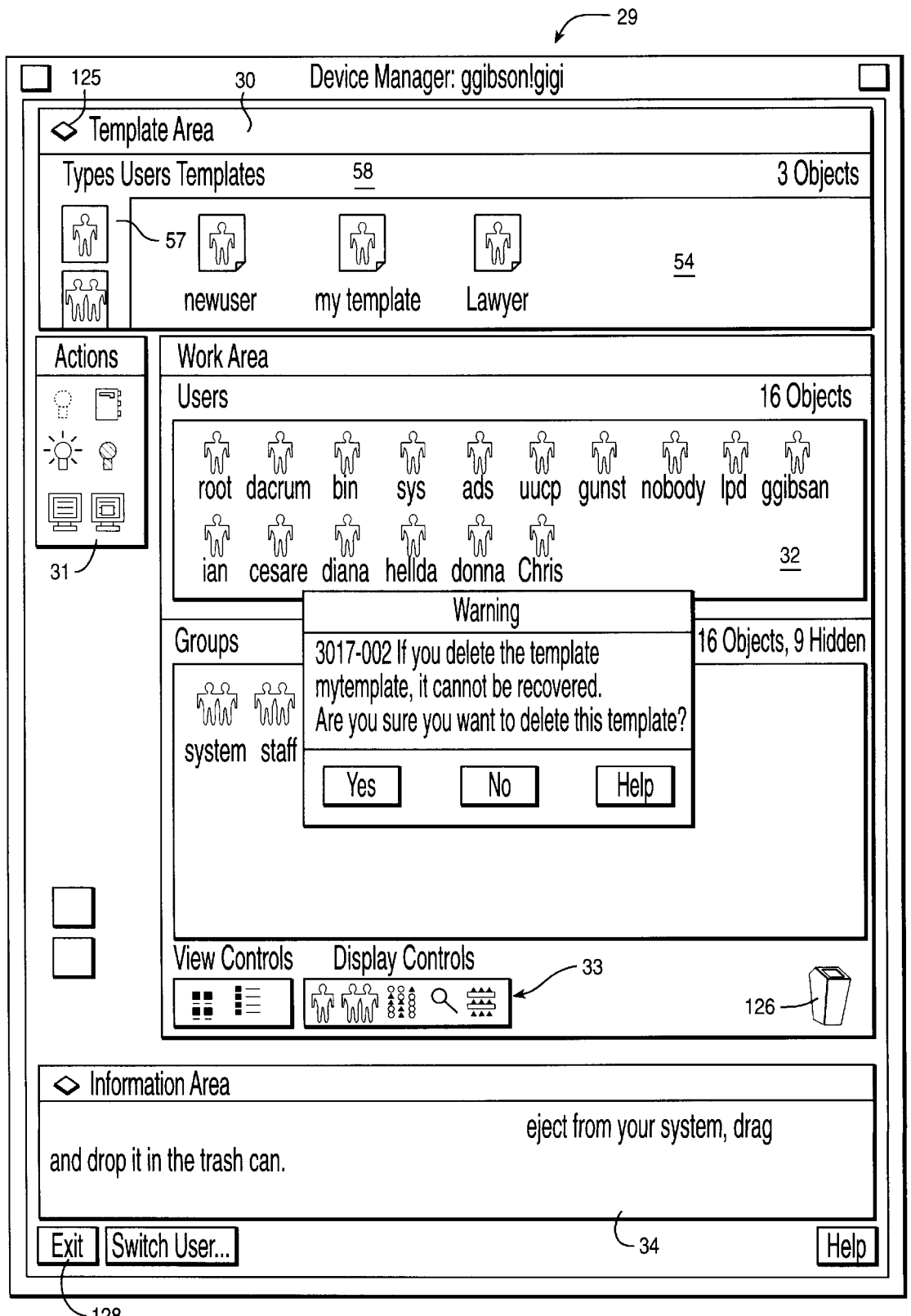
FIG. 14 is a pictorial view of a GUI display window that implements the present invention.

FIG. 13 illustrates a routine that allows the user to delete templates from template pane 54 as illustrated in FIG. 14. Although FIG. 14 illustrates the deletion of user templates, the routine of FIG. 13 operates to delete any template from a displayed attribute group. After receiving a user input at step 140 as previously described, decision step 141 determines if the cursor resides on a template. If the cursor is not on a template, the GUI in step 142 responds to the user input accordingly, which includes the execution of any one of the previously described routines.

If the cursor resides on a template, decision step 143 determines whether the mouse selection button has been depressed. If the the mouse selection button has not been depressed, decision step 141 repeats to determine if the cursor remains on the template. However, if the mouse selection button has been depressed, the GUI recognizes the template as captured, and step 144 displays a cursor indicating an invalid drop site.

Decision step 145 then determines if the cursor has been relocated over trash can 126 by moving the cursor using the mouse while continuing the depression of the mouse selection button. If the cursor does not reside over trash can 126, decision step 146 determines whether the selection button on the mouse has been released. Continued depression of the mouse selection button results in decision step 145 again determining whether the cursor resides over trash can 126. However, if the mouse selection button has been released with the cursor not over trash can 126, step 154 returns the outline of the captured template icon to its position within template pane 54 and displays an arrow cursor signifying the release of the captured template icon. After releasing the captured template, the GUI in step 155 waits for another user input.

If decision step 145 determines the cursor resides over trash can 126, step 147 displays a cursor indicating a valid drop site. Decision step 148 then determines when the mouse selection button is released. After release of the mouse selection button, decision step 149 determines if a delete confirmation dialog in the form of a pop-up window displays to query the user if template deletion is desired (see pop-up window 127 in FIG. 14). Whether a delete confirmation dialog displays depends upon user preference because the user has the option of either displaying or not displaying the delete confirmation dialog prior to the deletion of a template.

If decision step 149 determines the user chose not to display the delete confirmation dialog, step 150 deletes the template from the database. Step 153 then displays template pane 54 without the deleted template and exits the routine. However, if decision step 149 determines the user chose to display the delete confirmation dialog, pop-up window 127 displays as illustrated in FIG. 14. Decision step 152 determines whether the user desires to delete the template. If the user selects not to delete the template, step 153 removes pop-up window 127 and prevents the deletion of the template before exiting the routine. Alternatively, if decision step 152 determines a "yes" selection, step 154 removes pop-up window 127 from view, and step 150 deletes the template from the database. Step 153 then displays template pane 54 without the deleted template and exits the routine.

Figure 15:
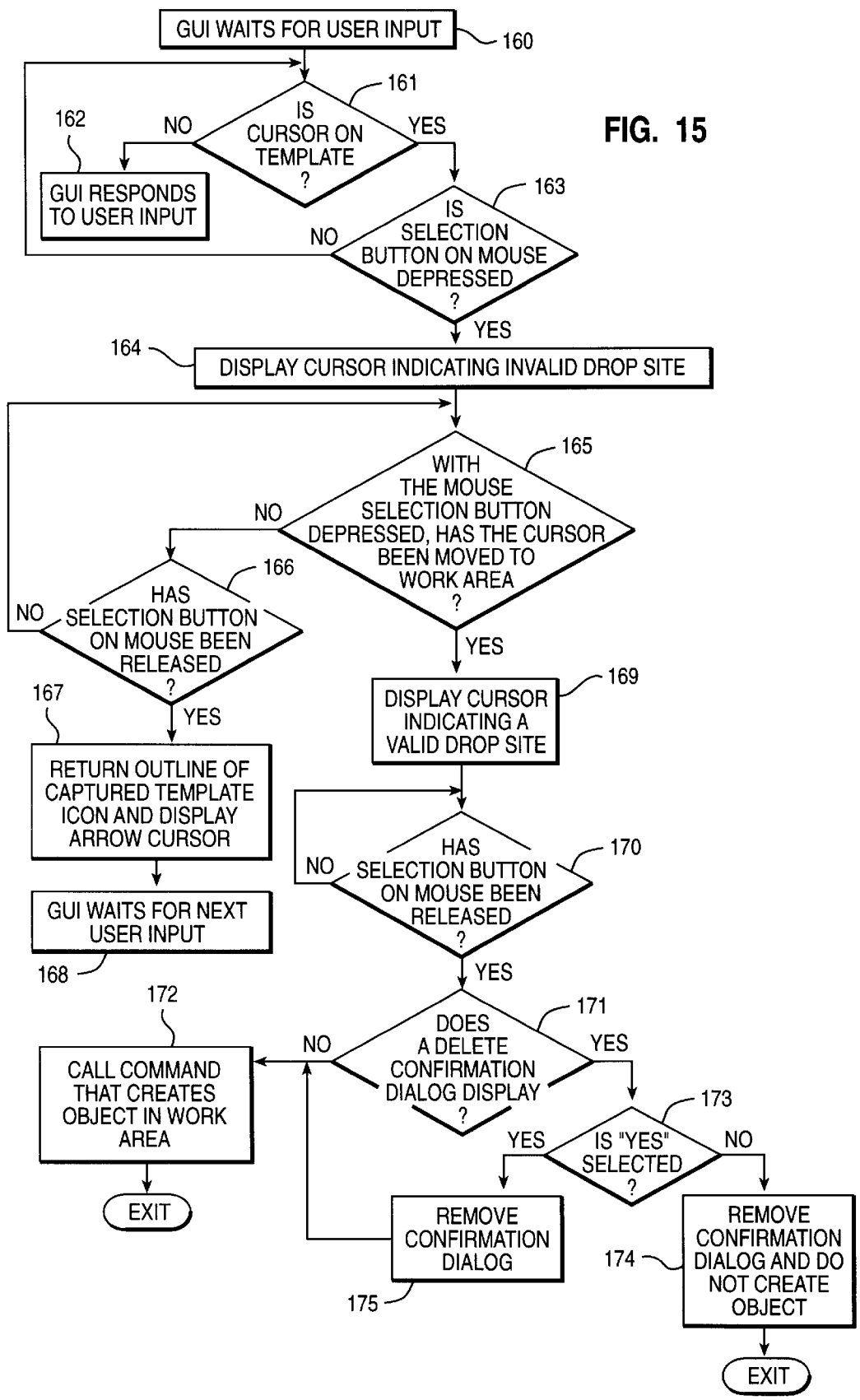
FIG. 15 is a flow chart illustrating a routine for creating objects in a work area of GUI display window using templates displayed in a template pane of a template area.

FIG. 15 illustrates a routine that allows the user to create an object within work area 32 using templates from template pane 54 as illustrated in FIG. 3. For example, the routine of FIG. 15 permits the user to add a device to workstation 10 (i.e., create an object) by merely dropping the desired template in work area 32. After receiving a user input at step 160 as previously described, decision step 161 determines if the cursor resides on a template. If the cursor is not on a template, the GUI in step 162 responds to the user input accordingly, which includes the execution of any one of the previously described routines.

If the cursor resides on a template, decision step 163 determines whether the mouse selection button has been depressed. If the mouse selection button has not been depressed, decision step 161 repeats to determine if the cursor remains on the template. However, if the mouse selection button has been depressed, the GUI recognizes the template as captured, and step 164 displays a cursor indicating an invalid drop site.

Decision step 165 then determines if the cursor has been relocated in work area 32 by moving the cursor using the mouse while continuing the depression of the mouse selection button. If the cursor does not reside within work area 32, decision step 166 determines whether the selection button on the mouse has been released. Continued depression of the mouse selection button results in decision step 165 again determining whether the cursor resides within work area 32. However, if the mouse selection button has been released with the cursor not within work area 32, step 167 returns the outline of the captured template icon to its position within template pane 54 and displays an arrow cursor signifying the release of the captured template icon. After releasing the captured template, the GUI in step 168 waits for another user input.

If decision step 165 determines the cursor resides within work area 32, step 169 displays a cursor indicating a valid drop site. Decision step 170 then determines when the mouse selection button is released. After release of the mouse selection button, decision step 171 determines if a create confirmation dialog in the form of a pop-up window displays to query the user if object creation is desired. Whether a create confirmation dialog displays depends upon user preference because the user has the option of either displaying or not displaying the create confirmation dialog prior to the creation of a template.

If decision step 171 determines the user chose not to display the create confirmation dialog, step 172 calls the command that creates the object from the template and exits the routine so that the object can be created. However, if decision step 171 determines the user chose to display the delete confirmation dialog, the create confirmation dialog in the form of a pop-up window displays. Decision step 172 determines whether the user desires to create the object. If the user selects not to create the object, step 174 removes the pop-up window and prevents the creation of the object before exiting the routine. Alternatively, if decision step 173 determines a "yes" selection, step 175 removes the pop-up window from view, and step 172 calls the command that creates the object from the template and exits the routine so that the object can be created.

As illustrated in FIG. 3, template area 30 operates with information area 34 using a cursor driven by a mouse as previously described. When the mouse is manipulated to point the cursor to any one of template area control button 125, the template types in template pane 57, the templates displayed in template pane 54, the title displayed in template title pane 58, or scroll bar 56, information area 34 displays textual material that describes the particulars of the indicated template area. Additionally, exit button 128 permits the user to exit the GUI so that the user may operate workstation 10 in the performance of another task such as displaying a different attribute group, wordprocessing, etc.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

We claim:

1. A method for controlling a computer workstation to display attributes of the computer workstation, comprising the computer-implemented steps of:

displaying a template area on a display, said template area comprising a template types pane and a template pane;

retrieving each group of attributes of the computer workstation from a database;

storing each group of attributes in a workstation memory;

selecting one group from the group of attributes for display;

retrieving sets of attributes from the selected group of attributes from the workstation memory;

selecting one set from the sets of attributes for display;

retrieving individual attributes of the selected set of attributes from the workstation memory;

displaying icons representing the sets of attributes in said template types pane; and displaying icons representing the individual attributes of the selected set in said template pane area.

2. The method according to claim 1 further comprising the steps of:

determining if a new set of attributes has been selected for display;

clearing said template pane of individual attributes; and displaying the individual attributes of the newly selected set of attributes within said template pane.

3. The method according to claim 1 further comprising the steps of:

ceasing the display of said template types area if the number of sets of attributes retrieved from said database equals one; and redisplaying said template pane to include the section of said template area displaying said template types area.

4. The method according to claim 1 further comprising the steps of:

determining if said template area is open or closed in response to a template area control command;

ceasing the display of said template area if said template area is open;

displaying said template area if said template area is closed.

5. The method according to claim 1 further comprising the steps of:

determining a state of a template area display command;

ceasing the display of said template area if the state of said template area display command is close; and continuing the display of said template area if the state of said template area display command is open.

6. The method according to claim 1 further comprising the steps of:

determining if an action command has been selected;

determining if the action command is a valid command for said template area; and executing said action command if it is a valid command for said template area.

7. The method according to claim 1 further comprising the steps of:

determining if a view command has been selected;

determining if the view command is a valid command for said template area; and executing said view command if it is a valid command for said template area.

8. The method according to claim 1 further comprising the steps of:

determining if a display command has been selected;

determining if the display command is a valid command for said template area; and executing said display command if it is a valid command for said template area.

9. The method according to claim 1 further comprising the steps of:

determining if an attribute displayed in said template area has been selected;

determining if an attribute delete command has been selected;

deleting the selected attribute from said database if the attribute delete command has been selected; and redisplaying said template area without the deleted attribute.

10. The method according to claim 1 further comprising the steps of:

determining if an attribute displayed in said template area has been selected;

determining if an object create command has been selected;

creating the object utilizing the selected attribute if the object create command has been selected; and storing the created object in said database.

11. An apparatus for displaying attributes of a computer workstation, comprising:

a processor;

a memory;

user controls for controlling a pointer;

a display device;

a database;

means for controlling said processor to display a template area on said display device, said template area comprising a template types pane and a template pane;

means for controlling said processor to retrieve each group of attributes of the computer workstation from said database;

means for controlling said processor to store each group of attributes in said memory;

means for controlling said processor to select one group from the group of attributes for display;

means for controlling said processor to retrieve sets of attributes from the selected group of attributes from said memory;

means for controlling said processor to select one set from the sets of attributes for display;

means for controlling said processor to retrieve individual attributes of the selected set of attributes from said memory;

means for controlling said processor to display icons representing the sets of attributes in said template types pane; and means for controlling said processor to display icons representing the individual attributes of the selected set in said template pane.

12. The apparatus according to claim 11 further comprising:

means for controlling said processor to determine if a new set of attributes has been selected for display;

means for controlling said processor to clear said template pane of individual attributes; and means for controlling said processor to display the individual attributes of the newly selected set of attributes within said template pane.

13. The apparatus according to claim 11 further comprising:

means for controlling said processor to cease the display of said template types area if the number of sets of attributes retrieved from said database equals one; and means for controlling said processor to redisplay said template pane to include the section of said template area displaying said template types area.

14. The method according to claim 11 further comprising:

means, responsive to a template area control command, for controlling said processor to determine if said template area is open or closed;

means for controlling said processor to cease the display of said template area if said template area is open;

means for controlling said processor to display said template area if said template area is closed.

15. The apparatus according to claim 11 further comprising means for controlling said processor to cease the display of said template area on said display device if the number of attributes retrieved by said processor from said database equals one.

16. The apparatus according to claim 11 further comprising:

means for controlling said processor to determine a state of a template area display command;

means for controlling said processor to cease the display of said template area on said display device if the state of said template area display command is close; and means for controlling said processor to continue the display of said template area on said display device if the state of said template area display command is open.

17. The apparatus according to claim 11 further comprising:

means for controlling said processor to determine if an action command has been selected;

means for controlling said processor to determine if the action command is a valid command for said template area; and means for controlling said processor to execute said action command if it is a valid command for said template area.

18. The apparatus according to claim 11 further comprising:

means for controlling said processor to determine if a view command has been selected;

means for controlling said processor to determine if the view command is a valid command for said template area; and means for controlling said processor to execute said view command if it is a valid command for said template area.

19. The apparatus according to claim 11 further comprising:

means for controlling said processor to determine if a display command has been selected;

means for controlling said processor to determine if the display command is a valid command for said template area; and means for controlling said processor to execute said display command if it is a valid command for said template area.

20. The apparatus according to claim 11 further comprising:

means for controlling said processor to determine if an attribute displayed in said template area has been selected;

means for controlling said processor to determine if an attribute delete command has been selected;

means, responsive to the attribute delete command, for controlling said processor to delete the selected attribute from said database; and means for controlling said processor to redisplay said template area on said display device without the deleted attribute.

21. The apparatus according to claim 11 further comprising:
   means for controlling said processor to determine if an attribute displayed in said template area has been selected;
   means for controlling said processor to determine if an object create command has been selected;
   means, responsive to the object create command, for controlling said processor to create the object utilizing the selected attribute; and
   means for controlling said processor to store the created object in said database.

* * * * *